July 2, 1963   H. W. BATCHELLER   3,096,136
WIRE-GRIPPING PART OF ELECTRIC TERMINAL MEMBER
Original Filed Oct. 31, 1957

Inventor
Hugh W. Batcheller
Morse T Altman
Attys.

United States Patent Office 3,096,136
Patented July 2, 1963

3,096,136
WIRE-GRIPPING PART OF ELECTRIC
TERMINAL MEMBER
Hugh W. Batcheller, Newton, Mass., assignor to Kent
Mfg. Corp., Newton, Mass., a corporation of Massachusetts
Original application Oct. 31, 1957, Ser. No. 693,712. Divided and this application Dec. 31, 1958, Ser. No. 784,346
1 Claim. (Cl. 339—276)

This application is divided from my copending application, Serial No. 693,712, filed October 31, 1957, now Patent No. 2,982,329. The invention relates to an electric terminal member having improved means for attaching it to a wire. Electric terminals such, for example, as connector members are attached to the ends of wires prior to their being put to use. There are various ways of attaching a metal member to the end of a wire but the most frequently used form of connection is made by crimping a tongue or tongues of metal around the bared end portion of an insulated wire. If this is properly done, a connection can be had which is as good electrically as a connection made by soldering or welding the wire to the metal piece.

Some electric connector members are made to be attached to wires which are laid at right angles to the longitudinal axis of the connector member. In such cases, a tongue is provided which extends in the direction of the axis of the member, such tongue being adapted to be wrapped or crimped around the end portion of wire to make the joint or connection between the metal member and the wire. When such a tongue is crimped or curled about a wire, the metal retains a tendency to unroll or relax somewhat, no matter how much force is exerted in the crimping operation. This tendency to relax is often augmented by temperature conditions when current which is passing through the wire and terminal member heats up the joint between them. It is an object of the present invention to make the joint secure so that the tongue which is crimped around the wire cannot relax so as to ease the pressure of the crimped tongue on the wire itself. Such pressure between the metal member and the wire which it embraces is important for a good electrical connection.

According to the invention, the tongue which is crimped around a wire is secured in place by means of a small lug or tab which is struck up from the standing part of the tongue in such a way as to overlap the extremity of the tongue after the latter has been wrapped around the wire. For a more complete understanding of the invention reference may be had to the following description thereof and to the drawing of which:

Figure 1:
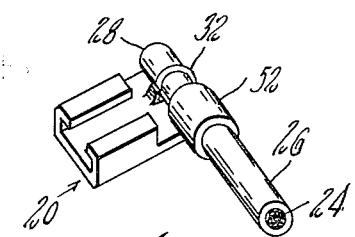
FIGURE 1 is a perspective view of an electric terminal member attached to the end of an insulated wire.
Figure 2:
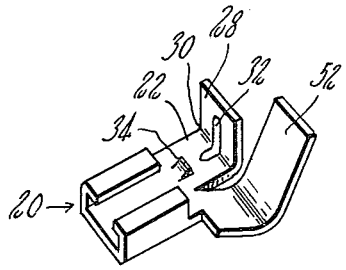
FIGURE 2 is a perspective view of the terminal member before being attached to a wire.
Figure 3:
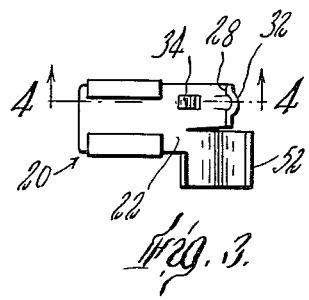
FIGURE 3 is a plan view of the same.
Figure 4:
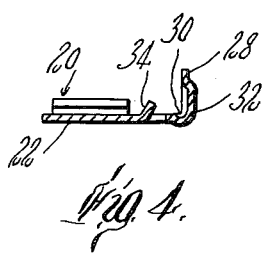
FIGURE 4 is a section on the line 4—4 of FIGURE 3.

While the invention relates to joints between any sheet metal member and a wire, a connector member 20 which is adapted to be attached to a wire disposed at right angles to its longitudinal axis is illustrated on the drawing by way of example since the problem of making a tight electrical connection between a terminal member of this kind and a wire has been found to be particularly troublesome, but the invention is not limited to any particular type of terminal member. As shown in FIGURE 2 the member 20 has a tongue 22 which is adapted to be crimped to a bared end of a wire 24 which is insulated as at 26. The tongue 22 is an integral extension of the floor of the connector member 20 and projects from the terminal portion of the member along the longitudinal axis thereof. In order to facilitate the crimping operation, the end portion 28 of the tongue 22 is bent upward as indicated in FIGURE 2 forming an angle 30 to receive a wire 24. If desired, the tongue 22 may be provided with a longitudinal indentation resulting in a rib 32 on the other face thereof to stiffen the tongue so that when it has been crimped around a wire as hereinafter described, the rib 32 will help to oppose the tendency on the part of the tongue to relax slightly its grip on the wire 24. According to the present invention, however, a more positive means is provided for anchoring the tongue in its crimped position and preventing any relaxing or loosening thereof. To this end a tab or lug 34 is struck up from the standing portion of the tongue 22, that is, the portion which is adjacent to the terminal part of the member 20. The lug is formed by a U-shaped cut and is struck up from the plane of the standing portion of the tongue 22 so that it assumes a vertical position. When a connector member 20 is to be attached to the bared end of a wire, the wire is laid in the angle 30 and the end portion 28 of the tongue is crimped around the wire by suitable dies until its extremity touches the floor of the tongue 22 and bears against the lug 34. The lug is then bent down to overlap the end portion 28 of the tongue and to press down on it. The lug 34 may be pressed down with sufficient force to press the mid portion of the extremity of the tongue slightly downward into the hole 50 from which the lug 40 was struck. Since the lug 34 is relatively short and therefore stiff, it firmly holds the extremity of the tongue down against the standing part of the tongue so that it cannot relax to ease the pressure of the tongue on the wire which it embraces.

Ordinarily, a second tongue 52 is provided to embrace the portion of the insulated wire which is adjacent to the bared end. This tongue is parallel to and longer than the tongue 22 since it has to embrace an element of greater diameter, this element including the insulation as well as the wire itself. This tongue may be provided with a locking tab if desired but ordinarily it will not be required since the strength of the grip of the crimped tongue 52 on the insulated portion of the wire is not so important as the strength of the grip of the tongue 22 on the wire itself, the latter forming the joint through which the electric current flows.

Figure 5:
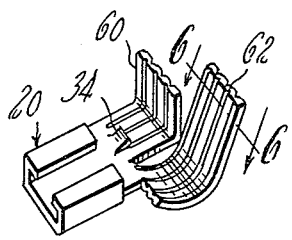
FIGURE 5 is a perspective view of a terminal member similar to that shown in FIGURE 2 except that both of the wire-embracing tongues are longitudinally corrugated.
Figure 6:
FIGURE 6 is a section on the line 6—6 of FIGURE 5.
Figure 7:
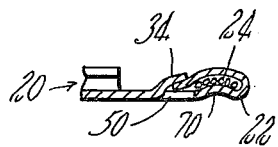
FIGURE 7 is a sectional view of a terminal member which has been crimped to a wire.

Instead of the stiffening rib 32 extending along the median of the tongue 22, one or both of the tongues may be longitudinally corrugated as indicated at 60 and 62 in FIGURES 5 and 6. Such corrugations serve to counteract to a considerable extent the natural tendency on the part of crimped tongues to relax a little when the crimping pressure thereon is relieved.

It will be evident that there are modifications and changes that may be made in the specific embodiments herein shown and described without departing from the spirit or scope of the invention as set forth in the following claim.

I claim:

An electric terminal member made of a single piece of sheet metal and comprising a terminal portion and a portion adapted to grip a wire, said wire-gripping portion comprising a longitudinal extension from the terminal portion and having an extremity, a part of said extension being bent up forming an angle in which a wire can be laid, said extension having a small locking lug struck up therefrom and adapted to be engaged by the end of said extension when it is crimped around a wire and to be bent to overlap the extremity of the cramped extension.

References Cited in the file of this patent
UNITED STATES PATENTS

| | | |
|---|---|---|
| 2,596,528 | Carlson | May 13, 1952 |
| 2,659,871 | Berg | Nov. 17, 1953 |
| 2,716,741 | Ustin | Aug. 30, 1955 |
| 2,845,108 | Hammell et al. | July 29, 1958 |
| 2,884,478 | Becker et al. | Apr. 28, 1959 |
| 2,945,206 | Hammell | July 12, 1960 |